(12) United States Patent
Tsukidate

(10) Patent No.: US 9,059,882 B2
(45) Date of Patent: Jun. 16, 2015

(54) INFORMATION PRESENTATION CONTROL DEVICE AND INFORMATION PRESENTATION CONTROL METHOD

(71) Applicant: PANASONIC CORPORATION, Osaka (JP)

(72) Inventor: Ryota Tsukidate, Osaka (JP)

(73) Assignee: PANASONIC INTELLECTUAL MANAGEMENT CO., LTD., Osaka (JP)

( * ) Notice: Subject to any disclaimer, the term of this patent is extended or adjusted under 35 U.S.C. 154(b) by 385 days.

(21) Appl. No.: 13/710,040

(22) Filed: Dec. 10, 2012

(65) Prior Publication Data

US 2013/0103773 A1 Apr. 25, 2013

Related U.S. Application Data

(63) Continuation of application No. PCT/JP2012/001005, filed on Feb. 15, 2012.

(30) Foreign Application Priority Data

Aug. 25, 2011 (JP) ................................. 2011-183276

(51) Int. Cl.
*G06F 15/16* (2006.01)
*H04L 29/08* (2006.01)
(Continued)

(52) U.S. Cl.
CPC .......... *H04L 29/08072* (2013.01); *H04L 51/12* (2013.01); *H04L 51/28* (2013.01); *G06Q 10/101* (2013.01); *H04L 51/32* (2013.01); *H04L 51/16* (2013.01)

(58) Field of Classification Search
CPC .............. H04L 29/08072; H04L 51/12; G06F 17/30867; G06F 17/30386; G06Q 10/101
USPC ........... 709/202–203, 206–207; 707/736–737
See application file for complete search history.

(56) References Cited

U.S. PATENT DOCUMENTS 7,844,666 B2 11/2010 Horvitz et al.
8,117,212 B2 * 2/2012 Tateno et al. ................. 707/749
(Continued)

FOREIGN PATENT DOCUMENTS

JP 10-027181 A 1/1998
JP 2002-366393 A 12/2002
(Continued)

OTHER PUBLICATIONS

Japanese Office Action in corresponding JP Application No. 2012-531140 issued Aug. 28, 2012.
(Continued)

*Primary Examiner* — Bharat N Barot
(74) *Attorney, Agent, or Firm* — McDermott Will & Emery LLP

(57) ABSTRACT

An information presentation control device includes: an acquisition unit which acquires information items; an information total amount calculation unit which calculates a total amount of the information items; a sender importance level determining unit which determines sender importance levels each of which indicates how important a different one of senders is; an information total amount determining unit which determines whether or not the total amount of the information items is greater than a predetermined value; a filtering unit which performs, when it is determined that the total amount of the information items is greater than the predetermined value, at least one process on an information item having a lower sender importance level, among the information items, so that an amount of the information item is reduced more; and an output unit which outputs the information items after the filtering unit performs the process.

11 Claims, 13 Drawing Sheets

(51) Int. Cl.
*H04L 12/58* (2006.01)
*G06Q 10/10* (2012.01)

(56) References Cited

U.S. PATENT DOCUMENTS

| | | | | |
|---|---|---|---|---|
| 8,621,024 | B2* | 12/2013 | Tysowski et al. | 709/207 |
| 2003/0046421 | A1 | 3/2003 | Horvitz et al. | |
| 2008/0250452 | A1 | 10/2008 | Iwamoto | |
| 2010/0037149 | A1 | 2/2010 | Heath | |
| 2010/0114587 | A1* | 5/2010 | Masuyama et al. | 707/737 |
| 2010/0122309 | A1 | 5/2010 | Kawakami et al. | |
| 2011/0129018 | A1* | 6/2011 | Osaki et al. | 375/240.25 |

FOREIGN PATENT DOCUMENTS

| | | |
|---|---|---|
| JP | 2003-248647 A | 9/2003 |
| JP | 2003-248677 A | 9/2003 |
| JP | 2004-362452 A | 12/2004 |
| JP | 2005-346493 A | 12/2005 |
| JP | 2006-209379 A | 8/2006 |
| JP | 2008-204392 A | 9/2008 |
| JP | 2008-210042 A | 9/2008 |
| JP | 2008-278270 A | 11/2008 |
| JP | 2008-282357 A | 11/2008 |
| JP | 2010-157795 A | 7/2010 |
| JP | 2011-086145 A | 4/2011 |
| WO | WO-2006/019101 A1 | 2/2006 |
| WO | WO-2010/017304 A2 | 2/2010 |

OTHER PUBLICATIONS

International Search Report mailed Apr. 24, 2012 issued in corresponding International Application No. PCT/JP2012/001005.
Japanese Notice of Allowance issued in Japanese Patent Application No. 2012-531140 mailed Dec. 4, 2012.

* cited by examiner

| Sender identification information | Display name | Sender level |
|---|---|---|
| aaa@a.net | Mr. A | Level 4 |
| bbb@a.net | Mr. B | Level 3 |
| ccc@a.net | Ms. C | Level 2 |
| ddd@a.net | Ms. D | Level 1 |
| eee@a.net | Mr. E | Level 0 |

511    522    523

| Sender level | Level definition |
|---|---|
| Level 4 | Person designated as close friend among friends |
| Level 3 | Friend |
| Level 2 | Friend's friend |
| Level 1 | Person belonging to the same community as user |
| Level 0 | Ordinary person |

801 802

| Comment amount level | Threshold value | Sender level |
|---|---|---|
| Level 4 | 60 comments/minute | Level 4 |
| Level 3 | 30 to 59 comments/minute | Level 3 |
| Level 2 | 10 to 29 comments/minute | Level 2 |
| Level 1 | 5 to 9 comments/minute | Level 1 |
| Level 0 | 0 to 4 comments/minute | Level 0 |

FIG. 14

| Sender identification information (1401) | Comment time (1402) | Comment body (1403) |
|---|---|---|
| aaa@a.net | 2011.06.09 22:15:30 | YES! We Got IT! |
| bbb@a.net | 2011.06.09 22:15:35 | We are Champion!!!!!!!!!!!!!! |
| ccc@a.net | 2011.06.09 22:15:20 | YES!YES!YES!YES!YES! |
| ddd@a.net | 2011.06.09 22:15:40 | WOW!! |
| eee@a.net | 2011.06.09 22:15:30 | It's Cooooooooooooool! |

FIG. 15

| Sender level (1501) | Level definition (1502) |
|---|---|
| Level 4 | 30 - |
| Level 3 | 20 - 29 |
| Level 2 | 10 - 19 |
| Level 1 | 1 - 9 |
| Level 0 | 0 (no rating) |

FIG. 16

| Comment importance level (1601) | Definition (1602) |
|---|---|
| 2 | Original comment |
| 1 | Comment with citation |
| 0 | Forwarded comment |

| Comment amount level | Threshold value | Sender level |
|---|---|---|
| Level 2 | 20 or more comments/minute | Level 2 |
| Level 1 | 10 to 19 comments/minute | Level 1 |
| Level 0 | 0 to 9 comments/minute | Level 0 |

1701  1702  1703

INFORMATION PRESENTATION CONTROL DEVICE AND INFORMATION PRESENTATION CONTROL METHOD

CROSS REFERENCE TO RELATED APPLICATION

This is a continuation application of PCT International Application No. PCT/JP2012/001005 filed on Feb. 15, 2012, designating the United States of America, which is based on and claims priority of Japanese Patent Application No. 2011-183276 filed on Aug. 25, 2011. The entire disclosures of the above-identified applications, including the specifications, drawings and claims are incorporated herein by reference in their entirety.

FIELD

One or more exemplary embodiments disclosed herein relate generally to an information presentation control device and an information presentation control method.

BACKGROUND

Services on the Internet for sharing opinions, situations, or the like (hereafter, referred to as comment distribution services) have so far been available. The users of the services post, on Internet sites, their own opinions, situations, or the like as comments (short text information) consisting of approximately 200 characters or less, and browse comments posted by other users.

Regarding display of a log indicating an operation state of a computer system, Patent Literature (PTL) 1 discloses a technique of adjusting a display level of the log according to the number of unprocessed logs or CPU utilization.

Patent Literature (PTL) 2 discloses a method of determining a degree of urgency in message distribution, using a learning effect for a user.

Patent Literature (PTL) 3 discloses a method of rearranging display order of history records of visits to a home page, using a closeness level between a user and each visitor.

CITATION LIST

Patent Literature

[PTL 1] Japanese Unexamined Patent Application Publication No. 2002-366393
[PTL 2] Japanese Unexamined Patent Application Publication No. 2003-248677
[PTL 3] Japanese Unexamined Patent Application Publication No. 2008-282357

SUMMARY

Technical Problem

A problem to be solved is to preferentially display, even when many comments are present, a comment of a sender that a user desires among the comments.

The present disclosure has been conceived to solve the problem, and one non-limiting and exemplary embodiment provides an information presentation control device or the like that preferentially displays, among many comments, a comment of a sender that a user desires to browse.

Solution to Problem

In one general aspect, the techniques disclosed here feature an information presentation control device including: an acquisition unit configured to acquire a plurality of information items sent by a plurality of senders; an information total amount calculation unit configured to calculate a total amount of the information items acquired by the acquisition unit; a sender importance level determining unit configured to determine sender importance levels each of which indicates how important a different one of the senders is and is defined based on a closeness level indicating how socially close the one sender and a user of the information presentation control device are or a reliability level indicating how socially reliable the one sender is; an information total amount determining unit configured to determine whether or not the total amount of the information items calculated by the information total amount calculation unit is greater than a predetermined value; a filtering unit configured to perform, when the information total amount determining unit determines that the total amount of the information items is greater than the predetermined value, at least one process on an information item having a lower sender importance level, among the information items, so that an amount of the information item is reduced more, the amount of the information item being the number of characters or symbols constituting the information item; and an output unit configured to output the information items after the filtering unit performs the process.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

The information presentation control device according to one or more exemplary embodiments or features disclosed herein provides an advantageous effect of preferentially displaying, even when many comments are present, a comment of a sender that a user desires among the comments.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 14 is an exemplary comment management table.

FIG. 15 is an exemplary sender level definition table.

FIG. 16 is an exemplary comment importance level definition table.

DESCRIPTION OF EMBODIMENTS

Figure 1:
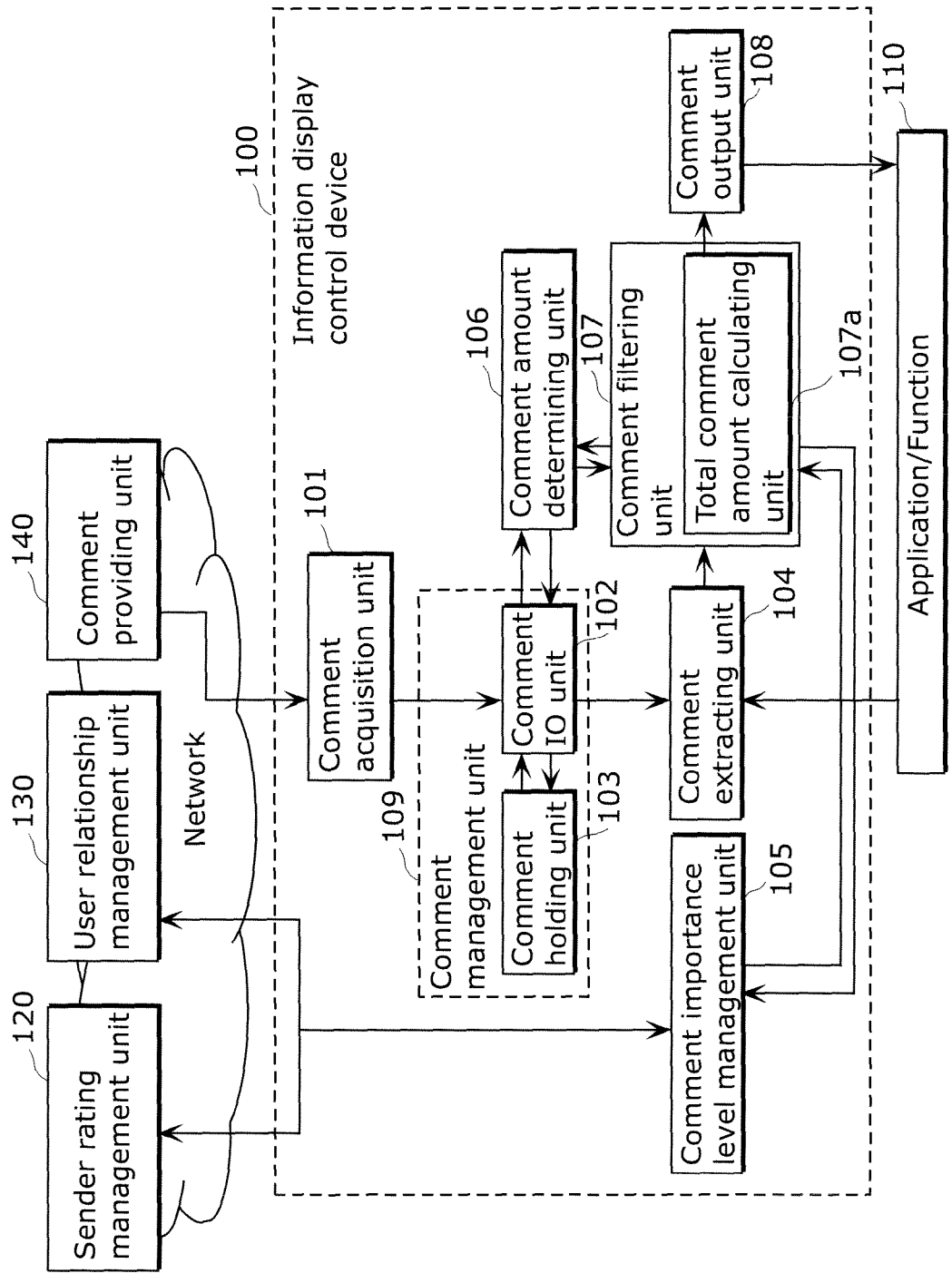
FIG. 1 is a functional block diagram showing an information display control device according to Embodiment 1 of the present disclosure.

Underlying Knowledge Forming Basis of the Present Disclosure

Services on the Internet for sharing opinions, situations, or the like (hereafter, referred to as comment distribution services) have so for been available. The users of the services perform communication, information sharing, or the like with other users by posting, on Internet sites, their own opinions, situations, or the like as comments (short sentence information) consisting of approximately 200 characters or less and browsing comments posted by the other users.

In contrast, a new style of viewing content has gradually become available in which, while content such as a TV program is being viewed, information about the TV program is transmitted to or received from a service that is different from a TV broadcast, using a personal computer, a cellular phone, or the like. For instance, a service that enables many users to post comments for the same content and to view the content together with the posted comments is available as a service for personal computers.

When viewers enjoy content while posting comments, a significant number of comments can be posted in a short period of time in the case where, for example, the content in question is a World Cup game or an Olympic event. In such a case, it is demanded that only important comments among the comments be found, and techniques for responding to the demand have been disclosed (e.g., PTL 1, PTL 2, and PTL 3).

Regarding display of a log indicating an operation state of a computer system, PTL 1 discloses a technique of adjusting a display level of the log according to the number of unprocessed logs or CPU utilization.

PTL 2 discloses a method of determining a degree of urgency in message distribution, using a learning effect for a user.

PTL 3 discloses a method of rearranging display order of history records of visits to a home page, using a closeness level between a user and each visitor.

However, when a significant number of comments are posted in a short period of time, a user needs to view the comments in a short period of time, resulting in the following problems. In other words, when comments whose amounts exceeding an amount recognizable by the user are displayed, new comments are displayed one after another before the user understands the comments, and the user cannot enjoy viewing content while reading posted comments.

Moreover, there is a case where comments sent by the user's friends are included in many comments. In this case, the user cannot easily find, among the comments, the comments sent by the user's friends. When missing comments of the user's friends viewing the same content in a distance environment, the user is unable to know the friends' impressions about the content, which may pose an obstacle to communication with the friends in the future.

In view of the above, a problem to be solved is to preferentially display, even when many comments are present, a comment of a sender that a user desires among the comments. The techniques disclosed by the PTLS cannot solve the problem.

The present disclosure has been conceived to solve the problem, and one non-limiting and exemplary embodiment provides an information presentation control device or the like that preferentially displays, even when many comments are present, a comment of a sender that a user desires to browse among the comments.

According to an exemplary embodiment disclosed herein, an information presentation control device including: an acquisition unit configured to acquire a plurality of information items sent by a plurality of senders; an information total amount calculation unit configured to calculate a total amount of the information items acquired by the acquisition unit; a sender importance level determining unit configured to determine sender importance levels each of which indicates how important a different one of the senders is and is defined based on a closeness level indicating how socially close the one sender and a user of the information presentation control device are or a reliability level indicating how socially reliable the one sender is; an information total amount determining unit configured to determine whether or not the total amount of the information items calculated by the information total amount calculation unit is greater than a predetermined value; a filtering unit configured to perform, when the information total amount determining unit determines that the total amount of the information items is greater than the predetermined value, at least one process on an information item having a lower sender importance level, among the information items, so that an amount of the information item is reduced more, the amount of the information item being the number of characters or symbols constituting the information item; and an output unit configured to output the information items after the filtering unit performs the process.

With this, it is possible to regulate a total data amount of comments to be outputted, by outputting, when many comments are present, a comment (an information item) of a sender that is unchanged since it was sent and a user desires to browse among the comments as well as by reducing an information amount of each of comments of other senders and outputting the comments. Thus, the user can easily find the comment of the sender that the user desires to browse among the comments, and simultaneously learn about the overview of the other comments.

For example, the filtering unit may perform the process by deleting, for each of the information items, part of the characters or symbols constituting the information item having the lower sender importance level so that the information item is reduced more without changing a meaning represented by the information item.

With this, it is possible to regulate the total data amount of the comments to be outputted, by outputting, when the comments are present, the comment of the sender that is unchanged since it was sent and the user desires to browse among the comments, as well as by reducing a character string of each of comments of senders other than the comment without changing a meaning indicated by the comment, and outputting the comments. Thus, the user can easily find the comment of the sender that the user desires to browse among the comments, and simultaneously learn about the overview of the other comments.

For example, the filtering unit may perform the process by deleting, for each of the information items, an information item having a sender importance level lower than the predetermined value, among the information items.

With this, it is possible to regulate the total data amount of the comments to be outputted, by outputting, when the comments are present, only the comment of the sender that the user desires to browse among the comments. Thus, the user can find the comment of the sender that the user desires to browse among the comments.

For example, each of the information items may be sent for dynamic content by the one sender in association with a reproduction time for the dynamic content, and the total amount of the information items may be a total number of information items per unit time in the dynamic content or a total data amount of information items sent in a unit time.

With this, it is possible to specify a time when many comments are posted, based on a comment amount per unit time that is generated for dynamic content. The above-described comment display control is performed in a period of time including the specified time. Thus, the user can find the comment of the sender that the user desires to browse among the comments, when the comment amount per unit time is large.

For example, each of the information items may be sent for static content by the one sender in association with a position in the static content, and the total amount of the information items may be a total number of information items per unit area of the static content or a total data amount of information items included in a unit area.

With this, it is possible to determine a region in static content on which comments are posted, based on the number of comments posted per unit area for the static content. The above-described comment display control is performed on the determined region. Thus, the user can find the comment of the sender that the user desires to browse among the comments, when the number of comments per unit area is large.

For example, each of the information items may be sent for an event in an actual time by the one sender in association with a time in the actual time, and the total amount of the information items may be a total number of information items per unit time in the actual time or a total data amount of information items sent in a unit time.

With this, it is possible to specify a time when many comments are posted, based on the number of comments per unit time for an event in an actual time. The above-described comment display control is performed in a period of time including the specified time. Thus, the user can find the comment of the sender that the user desires to browse among the comments, when the number of comments per unit time is large.

For example, the information presentation control device may further include a relationship management unit configured to classify, into one of brackets, the closeness level, wherein each of the sender importance levels may be the closeness level between the one sender and the user of the information presentation control device.

With this, it is possible to specify a comment of a sender having a close relationship with the user of the information display control device. Thus, the user can find, among the comments, the comment of the sender having the close relationship with the user.

For example, the information presentation control device may further include a reliability level management unit configured to classify, into one of brackets, the reliability level independently of the user of the information presentation control device, wherein each of the sender importance levels may be the reliability level of the one sender.

With this, it is possible to determine a comment of a trustworthy sender based on the reliability level of each sender indicated by an index independent of a relationship with the user of the information presentation control device. Thus, the user can find, among the comments, the comment of the trustworthy sender.

For example, the information presentation control device may further include a comment importance level determining unit configured to determine comment importance levels each of which indicates how important a different one of the information items is, wherein the filtering unit may perform, when the information total amount determining unit determines that the total amount of the information items is greater than the predetermined value, at least one process on the information items so that an amount of an information item, among the information items, having a lower comment importance level is reduced more.

With this, it is possible to reduce, when the comments are present, an information amount of an unimportant comment, and output the unimportant comment. Thus, the user can easily find an important comment among the comments, and simultaneously learn about the overview of the other comments.

For example, the acquisition unit may acquire, as one of the information items, a short text information item including a text composed of a character or a symbol and having a length shorter than a predetermined length.

With this, it is possible to use the information presentation control device in an online comment sending service in which the number of characters in information to be sent once is limited. Thus, the user can find, among the comments, the comment of the trustworthy sender.

According to an exemplary embodiment disclosed herein, an information presentation control method includes: acquiring a plurality of information items sent by a plurality of senders; calculating a total amount of the information items acquired in the acquiring; determining sender importance levels each of which indicates how important a different one of the senders is; determining whether or not the total amount of the information items calculated in the calculating is greater than a predetermined value; performing, when it is determined in the determining of whether or not that the total amount of the information items is greater than the predetermined value, at least one process on an information item having a lower sender importance level, among the information items, so that an amount of the information item is reduced more, the amount of the information item being the number of characters or symbols constituting the information item; and outputting the information items after the performing.

In this way, it is possible to produce the same advantageous effects as the information presentation control device.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

It is to be noted that each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

It is to be noted that hereafter there is a case where the same reference signs are assigned to the same structural elements, and descriptions thereof are omitted.

(Embodiment 1)

Non-limiting Embodiment 1 describes the operation of an information display control device when the users of a comment distribution service post comments for video content. It is to be noted that the information display control device is an exemplary information presentation control device. In addition, the video content is exemplary dynamic content.

(1-1. Configuration)

The embodiments of the present disclosure are described with reference to the drawings. First, the following describes the configuration of the information display control device according to Embodiment 1 of the present disclosure, with reference to FIGS. 1 to 4.

FIG. 1 is a functional block diagram showing the information display control device according to Embodiment 1 of the present disclosure. In addition, FIG. 1 shows various servers that are on a network and pertinent to the information display control device according to Embodiment 1 of the present disclosure.

As shown by FIG. 1, an information display control device 100 includes a comment acquisition unit 101, a comment IO unit 102, a comment holding unit 103, a comment extracting unit 104, a comment importance level management unit 105, a comment amount determining unit 106, a comment filtering unit 107, a comment output unit 108, and a comment management unit 109.

The comment acquisition unit 101 acquires comments from a comment providing unit 140 that is a server on the network. The comment acquisition unit 101 corresponds to an acquisition unit.

The comment management unit 109 manages the comments acquired by the comment acquisition unit 101. The comment management unit 109 includes the comment IO unit 102 and the comment holding unit 103. The comment holding unit 103 is a storage device that temporarily stores the comments acquired by the comment acquisition unit 101. The comment IO unit 102 registers the comments acquired by the comment acquisition unit 101, in the comment holding unit 103, or extracts comments from the comment holding unit 103.

The comment extracting unit 104 extracts comments from the comment holding unit 103 via the comment IO unit 102, according to an instruction (condition) from an application/function 110 that displays the comments. Here, the application/function 110 means an application or a function that displays content for which comments are posted and the comments in association with each other. For instance, there is an application that displays, while a TV program is being viewed, comments relevant to the TV program on a TV screen or a terminal at hand in conjunction with the progress of the TV program. It is to be noted that although the application is post-installed into the television or the terminal and the function is incorporated into the terminal before shipping, the application and the function do not differ in particular rank.

The comment importance level management unit 105 acquires relationship information from a user relationship management unit 130, creates or updates a sender management table, and manages comment importance levels based on the sender management table. The comment importance level management unit 105 corresponds to a sender importance level determining unit.

The comment amount determining unit 106 determines a comment amount (the number of comments) held in the comment holding unit 103 via the comment IO unit 102. The comment amount determining unit 106 corresponds to an information total amount determining unit.

The comment filtering unit 107 determines filtering conditions based on the levels of comment amounts held in the comment holding unit 103, which are determined by the comment amount determining unit 106, and the comment importance levels managed by the comment importance level management unit 105. In addition, the comment filtering unit 107 filters the comments extracted by the comment extracting unit 104. Here, each of the levels of the comments amount determined by the comment amount determining unit 106 is a level determined depending on which value range the comment amount, a specific value, belongs to. Moreover, the comment filtering unit 107 includes a comment total amount calculating unit 107a that calculates a total data amount of comments outputted to the comment output unit 108 within a certain period of time. The comment filtering unit 107 corresponds to a filtering unit. The comment total amount calculating unit 107a corresponds to an information total amount calculating unit. It is to be noted that the comment total amount calculating unit 107a may be outside of the comment filtering unit 107, and be communicable with the comment filtering unit 107.

The comment output unit 108 provides the comments filtered by the comment filtering unit 107, to the application/function 110. The comment output unit 108 corresponds to an output unit.

Furthermore, as shown by FIG. 1, a sender rating management unit 120, the user relationship management unit 130, and the comment providing unit 140 are present as the various servers that are on the network and pertinent to the information display control device according to Embodiment 1 of the present disclosure.

The sender rating management unit 120 is a service that ranks the reliability levels of senders of comments on a network based on activity history records of the senders on the network, and is already realized by an existing service.

The user relationship management unit 130 manages the human relationships of users on a social network, and is available in an existing social network service.

The comment providing unit 140 is a comment (writing) sharing service on a network that is represented by a microblog (a service that enables a very short comment to be written to a server on a network), an electronic bulletin board service, or the like, and is available as an existing service.

It is to be noted that the sender rating management unit 120, the user relationship management unit 130, and the comment providing unit 140 are implemented as the servers connected to the network, and each do not necessarily correspond to a single physical server device. Each of the sender rating management unit 120, the user relationship management unit 130, and the comment providing unit 140 may be implemented on a single or multiple server devices, or functions of the sender rating management unit 120, the user relationship management unit 130, and the comment providing unit 140 may be achieved on the single server device.

Figure 2:
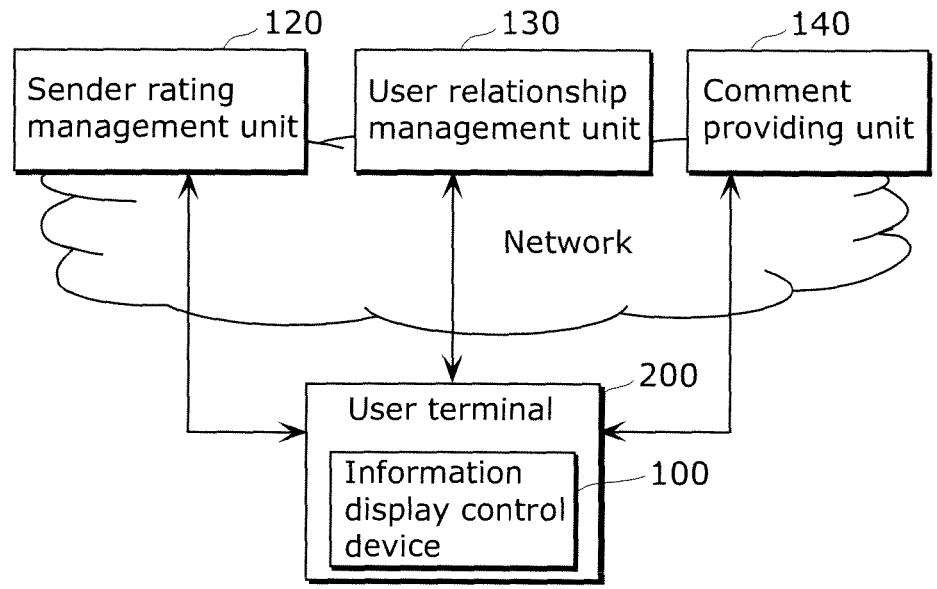
FIG. 2 is an example (modification A) of the functional block diagram showing the information display control device according to Embodiment 1 of the present disclosure.
Figure 3:
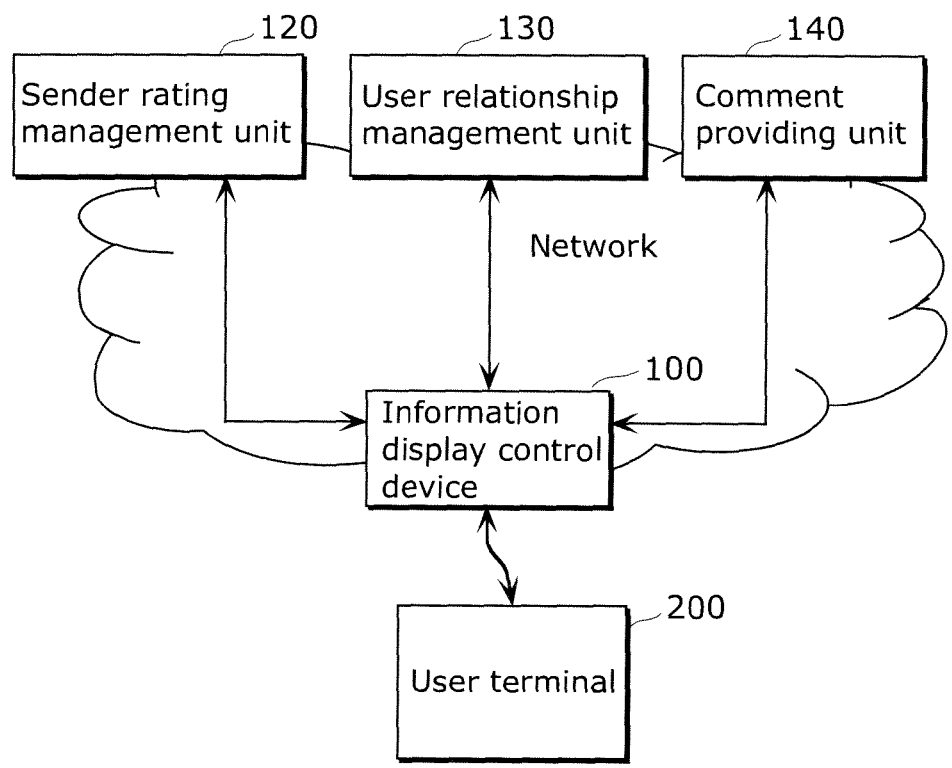
FIG. 3 is an example (modification B) of the functional block diagram showing the information display control device according to Embodiment 1 of the present disclosure.
Figure 4:
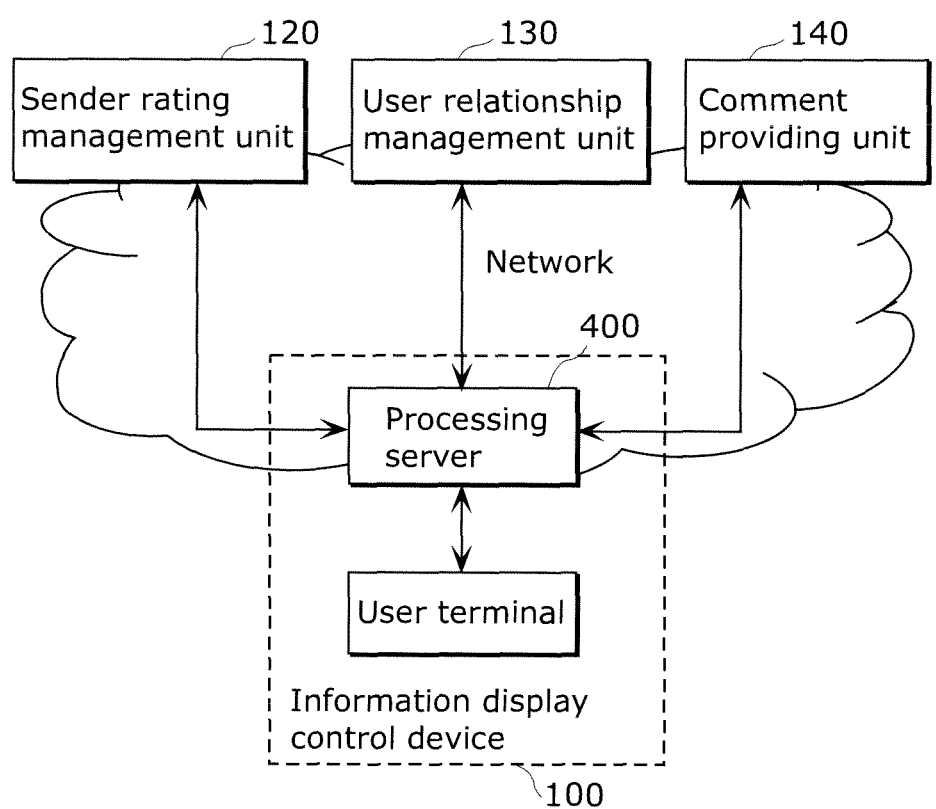
FIG. 4 is an example (modification C) of the functional block diagram showing the information display control device according to Embodiment 1 of the present disclosure.

It is to be noted that the information display control device 100 is realized in various modifications as shown by, for example, FIGS. 2, 3, and 4.

FIG. 2 is an example (modification A) of the functional block diagram showing the information display control device according to Embodiment 1 of the present disclosure. In the modification A, the information display control device 100 is included in a user terminal used by a user.

FIG. 3 is an example (modification B) of the functional block diagram showing the information display control device according to Embodiment 1 of the present disclosure. In the modification B, the application/function 110 that receives comments is included in a user terminal, and the information display control device 100 is included in a server on a network.

FIG. 4 is an example (modification C) of the functional block diagram showing the information display control device according to Embodiment 1 of the present disclosure. In the modification C, the functions of the information display control device 100 are decentrally implemented in a server on a network and a user terminal.

As stated, the physical positions of the blocks included in the information display control device 100 do not matter, and the functions of the information display control device 100 are achieved by overall operations performed by the blocks connected to each other through communication.

(1-2. Filtering Setting Operation)

Specific processing performed by the information display control device 100 is described with reference to the block diagram, flow charts, and information tables. First, the following describes a whole extent of the processing.

Figures 5A, 5B:
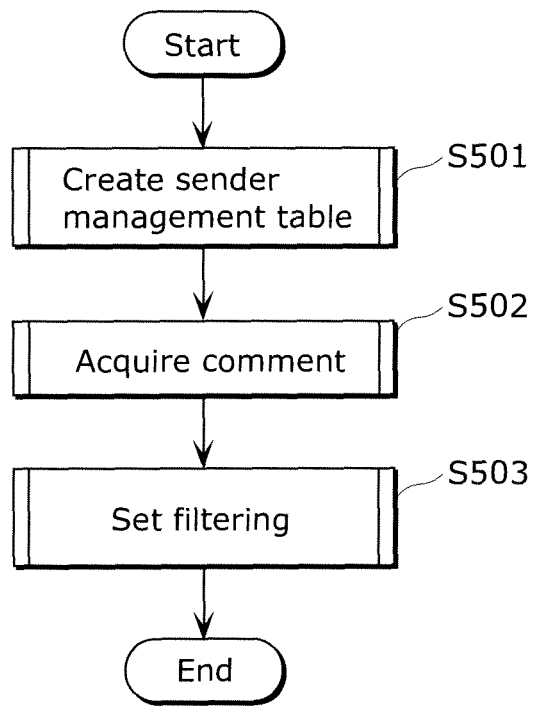
FIG. 5A is a flow chart for the information display control device according to Embodiment 1 of the present disclosure.
FIG. 5B is an exemplary sender management table.

FIG. 5A is a flow chart for the information display control device 100 according to Embodiment 1 of the present disclosure. As shown by FIG. 5A, the information display control device 100 first creates a sender management table that indicates, for the user of the information display control device 100 (hereafter, referred to as a user), the importance levels of respective senders (S501). Specifically, the comment importance level management unit 105 acquires relationship information from the user relationship management unit 130, and periodically creates the sender management table shown by FIG. 5B (S501). Moreover, the comment importance level management unit 105 performs management so that the sender management table is properly updated.

Next, the information display control device 100 acquires comments from the comment providing unit 140 (S502). Specifically, the comment acquisition unit 101 acquires the comments from the comment providing unit 140. The comment management unit 109 manages the acquired comments. The comment acquisition unit 101 may periodically acquire comments or acquire comments when the application/function 110 operates.

Next, the information display control device 100 performs filtering setting for comments (S503). Specifically, the comment extracting unit 104 extracts the comments managed by the comment management unit 109. Subsequently, the comment filtering unit 107 filters the comments using the sender management table managed by the comment importance level management unit 105. Here, in the case where the number of comments managed by the comment management unit 109 is large (the number of comments sent is large), only the comments of senders determined as important using the sender management table managed by the comment importance level management unit 105 pass through the comment filtering unit 107. In contrast, in the case where the number of comments managed by the comment management unit 109 is small, the comments of senders determined as not so important using the sender management table managed by the comment importance level management unit 105 also pass through the comment filtering unit 107. As above, it is possible to regulate the comment amount outputted from the comment output unit 108 to the application/function 110, according to the comment amount managed by the comment management unit 109.

Processes in S501, S502, and S503 are described in detail below.

The following describes in detail the creation of the sender management table. It is to be noted that the detailed description below is for S501 in FIG. 5A.

The information display control device 100 determines the importance levels of comments using the sender levels of comment senders, thereby determining filtering setting for the comments in the comment filtering unit 107. To put it another way, the filtering setting is determined so that relatively more comments sent by senders having a high sender level are outputted and relatively less comments sent by senders having a low sender level are outputted. Here, the term "sender level" is a closeness level indicating how close a sender and a user are. In the comment filtering, a comment having a high sender level means a comment sent by a sender having a high sender level (a sender having a high closeness level with the user). The above processes make it possible to preferentially display comments important for the user.

In this embodiment, the sender level of a comment is determined by a relationship between a sender and the user, that is, a closeness level between the sender and the user. The relationship between the sender and the user is managed by the user relationship management unit 130 that is in a social network service (SNS) on the Internet. Generally speaking, a closeness level of a relationship between a user and another user is defined by the depth of the relationship between the user and the other user.

Figure 7:
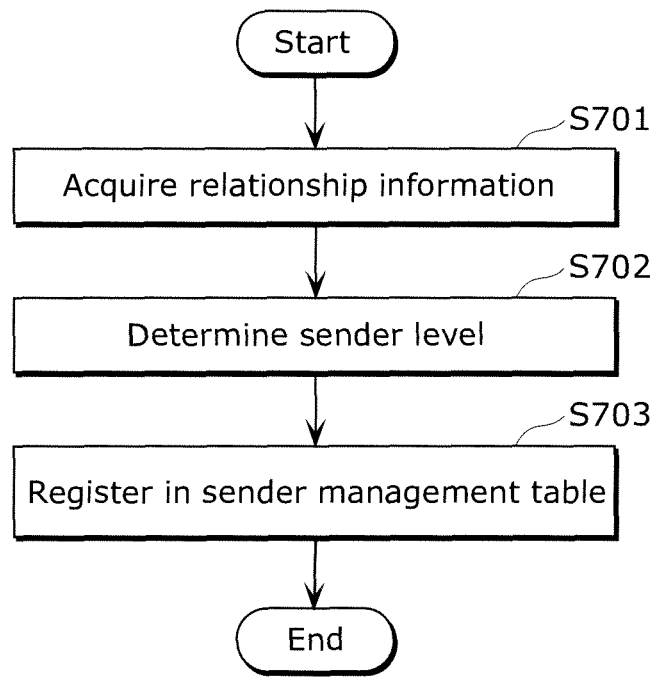
FIG. 7 is a flow chart for sender management table creation processing.

The following describes the creation of the sender management table with reference to FIG. 7.

Figures 8, 9:
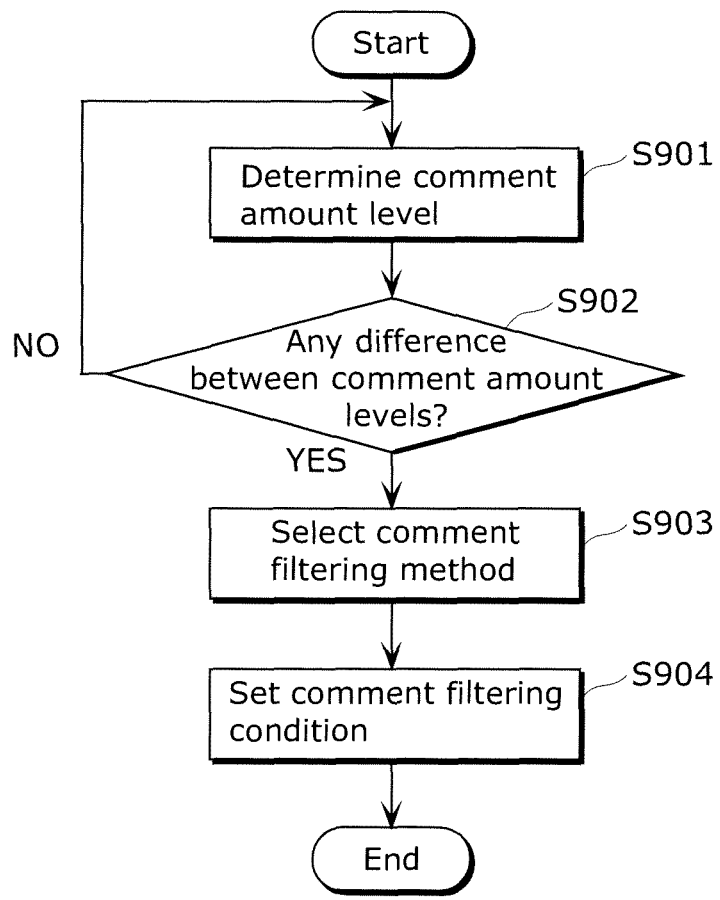
FIG. 8 is an exemplary sender level definition table.
FIG. 9 is a flow chart for comment filtering condition setting processing.

FIG. 7 is a flow chart for sender management table creation processing. The comment importance level management unit 105 acquires the relationship information of the user from the user relationship management unit 130 (S701). FIG. 8 is an exemplary sender level definition table. Here, the sender level definition table defines relationship levels (closeness levels) between senders and the user. Each of level definitions corresponds to one of sender levels 801 in the sender level definition table shown by FIG. 8. Level 0 is a sender level into which an "ordinary person" having no relationship with the user is classified. Level 1 is a sender level into which a "person belonging to the same community as the user" is classified. Level 2 is a sender level into which a "friend's friend" is classified. Level 3 is a sender level into which a "friend" is classified. Level 4 is a sender level into which a "person designated as a close friend among friends" is classified. It is possible to acquire, from the user relationship management unit 130 via an application programming interface (API) provided by the user relationship management unit 130, the sender levels in association with information for identifying the user (e.g., a user ID or an electronic mail address). It is to be noted that although the sender levels are defined based on the above categories in this embodiment, any classification will do as long as the classification defines the closeness levels between the senders and the user in categories, and the present disclosure is not limited to the number of the above categories and the definitions.

Next, the comment importance level management unit 105 compares the sender levels defined in the sender level definition table (FIG. 8) and the relationship information acquired in the relationship information acquisition process (S701), to determine a sender level of each sender (S702). In a sender level determining process, relationship information is searched based on information for identifying each sender (e.g., an electronic mail address or a display name), and the obtained relationship information and the sender levels are compared to determine the sender level of the sender. In the case where information for identifying a sender cannot be found even by searching relationship information, the sender level of the sender is determined to be the "ordinary person" (Level 0).

Next, the comment importance level management unit 105 registers, in the sender management table, the information for identifying the sender (e.g., the electronic mail address or the display name) and the determined sender level in association with each other (S703). It is assumed that information for identifying a sender (e.g., an electronic mail address or a display name) is associated with a comment acquired from the comment providing unit 140. FIG. 5B is an exemplary sender management table. As shown by FIG. 5B, the sender management table manages sender identification information 511, a display name 512, and a sender level 523. The sender identification information 511 and the sender level 523 are essential among the three, and there is no limitation set as to whether or not items other than the sender identification information 511 and the sender level 523 are collectively managed.

For example, a sender whose sender identification information 511 indicating aaa@a.net has a sender level 523 that is Level 4 according to the sender management table (FIG. 5B), and is defined as a "person designated as a close friend among friends" according to the sender level definition table (FIG. 8). Stated differently, it is clear that the sender is a person having a closeness level of a close friend. In contrast, a sender whose sender identification information 511 indicates eee@a.net has a sender level 523 that is Level 0 according to the sender management table (FIG. 5B), and is clearly a general person ("ordinary person") having no particular relationship with the user according to the sender level definition table (FIG. 8). It is to be noted that although the general person having no particular relationship with the user is defined, such a person may be considered as undefined. Moreover, in the sender management table, it is possible to perform the same processing without managing a sender classified as an ordinary person (undefined). Not all senders but only senders having a relationship with the user are managed, and senders other than the managed senders are determined as ordinary persons.

It is to be noted that although the relationship information of the user is acquired in advance to create the sender management table (FIG. 5B) in this embodiment, senders may be sequentially identified by referring to the user relationship management unit 130 for relationship information without creating the sender management table (FIG. 5B), when the comment filtering unit 107 filters comments. In this case, instead of collectively acquiring the relationship information of the user as in the relationship information acquisition process (S701) shown by FIG. 7, the user relationship management unit 130 is queried about (referred to for) a level of each sender. In particular, managing all persons belonging to the same community as the user (persons whose sender level is Level 1) is managing many human relationships, and thus efficient processing can be achieved by performing management to determine, according to the sender management table (FIG. 5B), whether or not a sender is a friend (a person whose sender level is Level 3) or whether or not a sender is a "person designated as a close friend among friends" (a person whose sender level is Level 4) and by sequentially referring to the user relationship management unit 130 for relationship information in the case where the sender is classified into neither of the levels.

It is to be noted that the sender levels in the sender management table (FIG. 5B) are preferably updated by periodically referring to the user relationship management unit 130 for the relationship information. Moreover, it is possible to cause, in the case where the relationship information is updated, notification of the updated relationship information in cooperation with the user relationship management unit 130, and to update the sender levels in the sender management table (FIG. 5B) based on the updated relationship information.

It is to be noted that the sender levels are defined based on the depth of the relationships with the user, and the defined sender levels are used in this embodiment. It is, however, possible to use the objective reliability levels of senders on a network independently of the relationships between the senders and the user. Services that evaluate the objective reliability levels of senders have already been provided on a network. For instance, it is objectively determined that a sender whose sent comments are more frequently reproduced is trusted on a network, in the case where many people regularly read comments sent by the sender. Although a detailed description of determination criteria is omitted as the determination criteria are different from the essence of the present disclosure, objective reliability levels may be considered as ratings, and the objective reliability levels for senders may be acquired from the sender rating management unit 120 and used as the sender levels. It is possible to acquire the objective reliability levels of the senders by performing an inquiry process on the sender rating management unit 120 with information for identifying each sender as a key. It is assumed that the sender rating management unit 120 provides an API that responds to the inquiry.

Comment acquisition and registration processing is described with reference to FIG. 6. It is to be noted that the detailed description below is for S502 in FIG. 5A.

Figure 6:
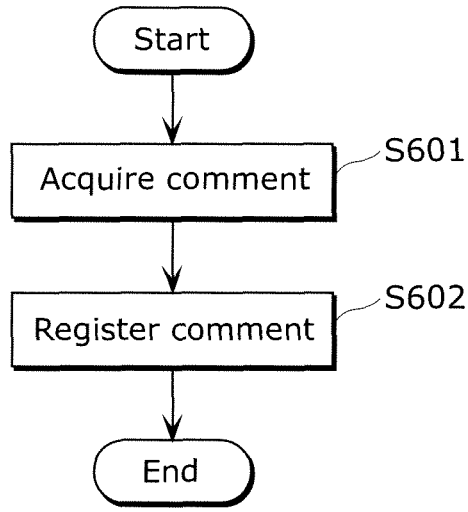
FIG. 6 is a flow chart for comment acquisition processing.

FIG. 6 is a flow chart for comment acquisition processing. As shown by FIG. 6, the comment acquisition unit 101 acquires a comment that satisfies a predetermined condition, from the comment providing unit 140 (S601). Next, the comment IO unit 102 registers the comment acquired by the comment acquisition unit 101, in the comment holding unit 103 (S602). It is to be noted that this processing is performed constantly or periodically.

It is to be noted that the condition for the comment acquisition unit 101 to acquire a comment is specified by the application/function 110 or the like that uses the comment. It is assumed that the condition for the comment acquisition unit 101 to acquire a comment is, for instance, described beforehand, in a configuration file, as configuration information of the comment acquisition unit 101. It is to be noted that the condition for the comment acquisition unit 101 to acquire a comment may be not only described in the configuration file but also stored in a storage area on a main memory that is not shown, a storage area on a database that is not shown, or the like.

Although an arrow is not shown in FIG. 1, the application/function 110 may dynamically specify a condition for acquiring a comment, to the comment acquisition unit 110. For example, in the case of an application that displays, while a TV program of a TV station is being shown, a relevant comment, when a rule is set that a comment includes an identifier corresponding to the TV station or the TV program is posted, a condition may be set that a comment includes the identifier. With this, it is possible to acquire and display a comment for a specific TV station or TV program. Here, specific examples of the identifier include a hash tag (e.g., #ABC) in a microblog service or the like.

It is to be noted that the comment acquisition unit 101 usually acquires a comment from the comment providing unit 140, using an API made public by the comment providing unit 140. Moreover, the comment management unit 109 including the comment IO unit 102 and the comment holding unit 103 is often implemented as a database system, and thus the comment management unit 109 may be implemented as a comment management database. Furthermore, although the example where the comment is temporarily stored in the comment holding unit 103 and the processing is performed is described in this embodiment, in the case where comments are acquired and displayed in real time, the comments may not be held, the comment acquisition unit 101 and the comment extracting unit 104 may acquire necessary comments in cooperation with each other, and the comment filtering unit 107 may directly detect a comment amount, determine the importance levels of the comments, and filter the comments in the same manner as in this embodiment.

Next, processing for determining a comment amount and concomitant processing for setting comment filtering are described with reference to FIGS. 9 and 10. It is to be noted that the detailed description below is for S503 in FIG. 5A.

FIG. 9 is a flow chart for comment filtering condition setting processing. The processing shown by FIG. 9 is periodically performed.

First, the comment amount determining unit 106 queries the comment filtering unit 107 about the number of comments outputted to the comment output unit 108 within a certain period of time, and determines a comment amount level by reference to a comment amount level definition table (FIG. 10) (S901).

Next, the comment amount determining unit 106 determines whether or not the comment amount level determined in S901 and a comment amount level immediately previously determined are different from each other (S902). In the case where the comment amount levels are different from each other (YES in S902), comment filtering method selection (S903) is performed. In contrast, in the case where the comment amount levels are equal to each other (NO in S902), the flow returns to the comment amount level determination (S901). The comment amount level determination (S901) is periodically performed. It is to be noted that a comment amount level when a previous comment amount level determination (S901) is performed is not yet determined when the comment amount level determination (S901) is first performed, and thus assuming that the comment amount levels are different from each other (YES in S902), the comment filtering method selection (S903) is performed.

Next, the comment amount determining unit 106 selects a comment filtering method by reference to the comment amount level definition table (FIG. 10) (S903).

Figures 10, 11:
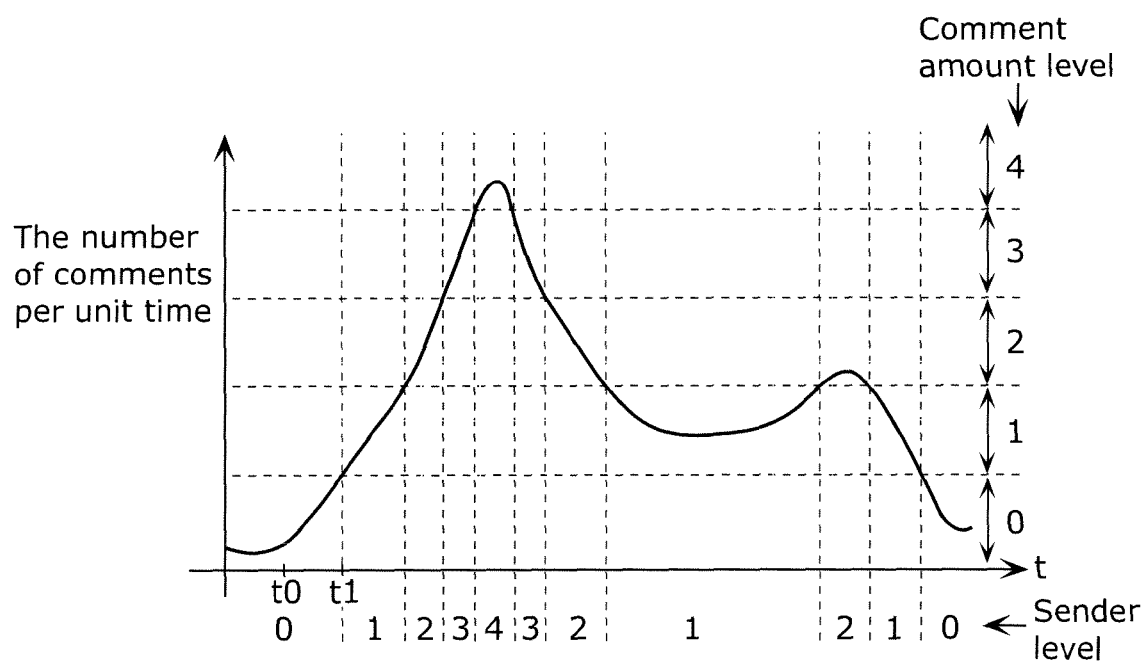
FIG. 10 is an exemplary comment amount level definition table.
FIG. 11 is a conceptual diagram for filtering of comments when comment amount varies.

FIG. 10 is an exemplary comment amount level definition table. In the comment amount level definition table, a comment amount level 1001, a threshold value 1002, and a sender level 1003 are associated with each other. FIG. 10 defines a comment amount level when the comment amount determined by the comment amount determining unit 106 is in a range indicated by the threshold value 1002. Furthermore, FIG. 10 defines the lowest value of a comment passing through (not filtered by) the comment filtering unit 107 when the comment amount level is indicated. The sender level of a comment outputted is determined based on the comment amount determined by the comment amount determining unit 106 and the comment amount level definition table, and is set to the comment filtering unit 107. For instance, in the case where a comment amount per unit time is 60 or more comments/minute, the comment amount level is determined as Level 4. Then, a filtering condition is set to the comment filtering unit 107 so that only the comments of senders whose sender level is higher than or equal to Level 4 are outputted, based on the comment amount level definition table (FIG. 10). Similarly, in the case where the comment amount per unit time is from 30 comments/minute to 59 comments/minute, the comment amount level is determined as Level 3. Then, the filtering condition is set to the comment filtering unit 107 so that only the comments of senders whose sender level is higher than or equal to Level 3 are not filtered. With this, it is possible to display, when the comment amount per unit time is very large, only the comments of senders having a high importance level for the user. In addition, it is possible to change the filtering condition set to the comment filtering unit 107, according to the comment amount per unit time. It is to be noted that the threshold value in the comment amount level definition table may be a certain value that is pre-set or may vary depending on a condition.

Each of the threshold values shown by FIG. 10 is an exemplary predetermined value. In other words, a threshold value corresponding to the lowest value of a sender level of senders whose comments pass through (are not filtered by) the comment filtering unit 107 is the predetermined value. For example, in the case where only the comments of the senders whose sender level is higher than or equal to Level 3 are not filtered, the predetermined value is 30 comments/minute.

FIG. 11 is a conceptual diagram for filtering of comments when a comment amount (the number of comments posted per unit time) varies. The horizontal axis indicates a time, and the vertical axis indicates the number of comments per unit time determined by the comment amount determining unit 106. When a comment amount level is 0 at time t0, a sender level at which the passage of comments is allowed by filtering is 0. When the comment amount level changes from Level 0 to Level 1 at time t1, the sender level is changed from Level 0 to Level 1 according to the comment amount level definition table. In the same manner, subsequently, as the comment amount per unit time (the vertical axis) increases over time (horizontal axis), the comments of senders having a higher sender level are to be outputted. When the comment amount per unit time decreases, a process of outputting the comments of senders having a lower sender level is performed. In this case, as stated above, the level of the sender is used for the sender level of each of displayed comments.

There is a case where the number of displayed comments is significantly reduced because the filtering condition becomes too strict as a result of the sender level changing to a higher sender level. The number of comments after filtering is detected by querying the comment filtering unit 107. In this case, instead of filtering (excluding) all the comments of senders having a lower sender level, a process of increasing the number of comments such as (1) selecting randomly and (2) adding another condition may be included so that the number of displayed comments is not reduced too much. Examples of the other condition include separately acquiring the objective reliability levels of senders on a network and using the objective reliability levels together with the sender levels. In addition, various conditions are conceivable. For example, the qualities of comments are determined by analyzing the details of the comments or a sender who performs posting more frequently is prioritized.

(1-3. Filtering Operation)

Figure 12:
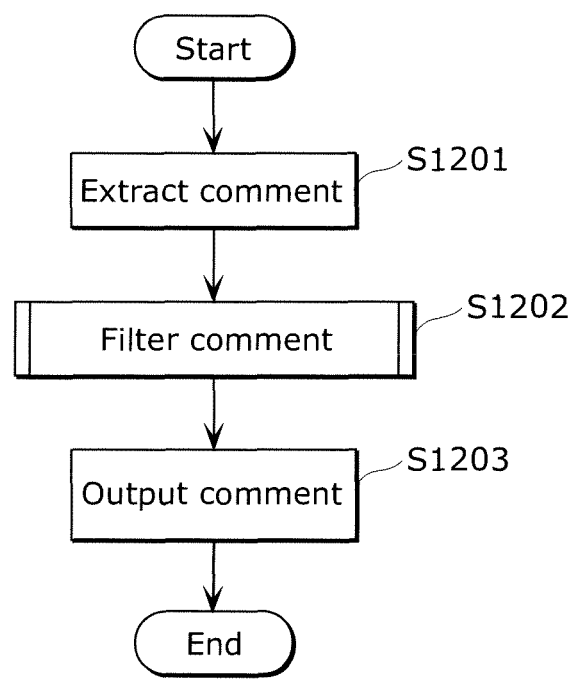
FIG. 12 is a flow chart for comment output processing.
Figure 13:
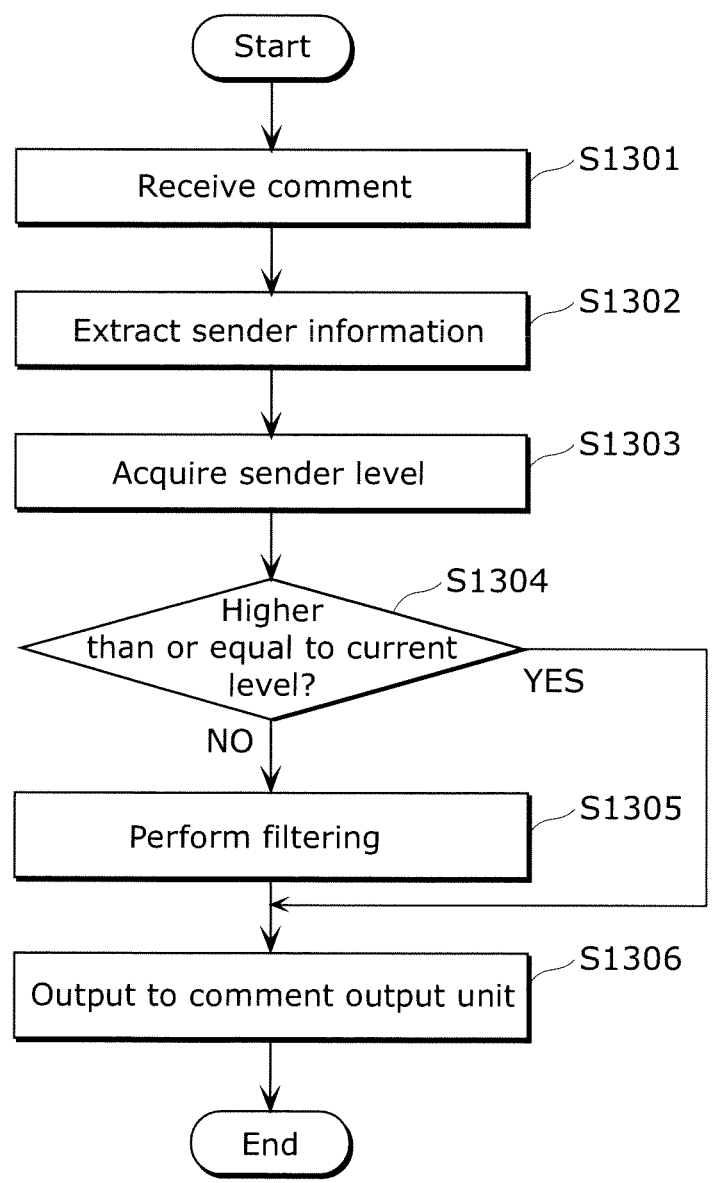
FIG. 13 is a flow chart for comment filtering processing.

The following describes filtering processing with reference to FIGS. 12, 13, and 14. FIG. 12 is a flow chart for comment output processing. Upon receiving, from the application/function 110, a request to display a comment, the comment extracting unit 104 acquires, from the comment IO unit 102, a comment that satisfies a specified condition, e.g. a comment about a specific TV station (S1201).

Next, the comment filtering unit 107 performs the comment filtering processing (S1202), and outputs a comment obtained from the filtering, to the comment output unit 108. Examples of the output method include displaying the comment on an application screen, replying to an external request as a web server, and outputting video to another apparatus. In addition, the output method may be any method as long as the method allows the user to receive the output result.

The comment filtering processing (S1202) performed by the comment filtering unit 107 is described in detail with reference to FIG. 13. FIG. 13 is a flow chart for comment filtering processing. The comment filtering unit 107 receives a comment from the comment extracting unit 104 (S1301), and analyzes the received comment to extract sender information (S1302). Next, the comment filtering unit 107 queries the comment importance level management unit 105 as to which sender level the sender of the comment belongs to, based on the extracted sender information (S1303). Then, the comment filtering unit 107 compares the sender level of the sender of the comment and a sender level that is the current filtering condition set by the comment amount determining unit 106, and determines whether the sender level of the sender of the comment is higher than or equal to the sender level that is the current filtering condition set by the comment amount determining unit 106 (S1304). In the case where it is determined that the sender level of the sender of the comment is higher than or equal to the sender level that is the current filtering condition (YES in S1304), the received comment is directly outputted. In contrast, in the case where it is determined that the sender level of the sender of the comment is less than the sender level that is the current filtering condition (NO in S1304), the filtering processing is performed (S1305).

More specifically, the filtering processing (S1305) includes various methods. One of the methods is a method of avoiding displaying a comment (discarding a comment). Another one of the methods is a method of not discarding a comment but performing character string processing so that a comment is shortened.

Examples of the character string processing include character string reduction processing in which in the case of a comment having the same successive characters, only the portion where the same characters succeed is deleted. This processing is described with reference to FIG. 14. FIG. 14 is an exemplary comment management table. In the comment management table shown by FIG. 14, the comment "We are Champion!!!!!!!!!!!!!!!!" is reduced into, for instance, the comment "We are Champion!" through the character string reduction processing. Moreover, the comment "It's Coooooooooooooooool!" is reduced into, for example, the comment "It's Cool!" through the character string reduction processing. In this way, the number of characters in a comment to be displayed is reduced. It is to be noted that a character string reduction amount may be varied according to a sender level of a sender of a comment. To put it another way, the reduction amount may be set smaller (a character string after the character string processing may be longer) as the sender of the comment has a higher sender level, and the reduction amount may be set larger (the character string after the character string processing may be shorter) as the sender of the comment has a lower sender level.

The above character string reduction processing is exemplary, and other processing in which a character string is reduced can be employed.

A character size of a comment when the comment output unit 108 outputs the comment may be reduced as the character string processing.

In the case where a long uniform resource locator (URL) or the like is described, the number of characters is reduced by, for instance, abbreviating the URL. The URL abbreviation processing is already provided as a service on a network, and thus a detailed technical description thereof is omitted.

As above, the comment on which the filtering processing is performed is outputted to the comment output unit 108 (S1306). Subsequently, the processes in S1301 to S1306 are repeatedly performed on a comment that is received next. In this manner, it is possible to perform control so that the comment of the sender important for the user is preferentially displayed, according to the comment amount.

It is to be noted that although information to be acquired is expressed as a comment in this embodiment, this is an example, and the information is not limited to the comment and may be expressed as data or content provided by the user. In addition, although the term "comment" is used for the names of the constituent elements, processable data is not limited to the comment, and various data or content provided by the user corresponds to the comment.

Although the number of comments per unit time is used to determine the comment amount, a sum of the numbers of characters per unit time which constitute each comment or a sum of the number of ideographic characters (e.g., Chinese characters) per unit time which are used for each comment may be used to determine the comment amount. This is because more accurate determination is made possible than the determination based on the number of comments per unit time as there is a case where it is difficult to view a comment when the number of characters is large but the number of comments per unit time is small, and further a larger number of ideographic characters results in more information amount. It is desirable to appropriately adjust a threshold value (the condition that the comment amount determining unit 106 sets to the comment filtering unit 107) based on, for instance, the number of comments, the number of characters, or the number of ideographic characters that are used to determine the comment amount.

It is to be noted that although the description is given in this embodiment based on the assumption that the comment is displayed on the screen, reading aloud a comment by a voice makes it possible to provide the same effects. Stated differently, there is a case where reading aloud a comment and viewing a comment differ from each other in the number of audible characters per unit time or the like, it is desirable to set a threshold value suitable for the case of reading aloud a comment. The condition that the comment amount determining unit 106 sets to the comment filtering unit 107 determines the threshold value.

It is desirable to set the threshold value based on the number of comments or the number of characters that are easy for the user to view or listen to, in consideration of the characteristics of a display means or a voice production means that outputs a comment, such as a screen size and the performance of a speaker. For instance, in the case where a viewer views content on a large-screen television and reads a comment on a tablet terminal at hand, the number of recognizable comments is thought to be reduced since the viewer greatly shifts the eyes. Thus, it is conceivable to, for example, set the threshold value (the condition that the comment amount determining unit 106 sets to the comment filtering unit 107) higher than usual.

As stated above, it is possible to preferentially display the comment of the sender having a close relationship with the user in consideration of the relationships of the user (the sender having the high sender level). Consequently, it is possible to produce an effect of allowing the user to understand more common topics for future communication with the sender having the close relationship with the user. It is to be noted that although the information display control device 100 acquires the comment itself from the comment providing unit 140 and processes the comment in this embodiment, there is a case where it is not permitted to temporarily hold a comment and re-provide the comment depending on a comment sending service specification. In such a case, the information display control device 100 may perform the above processing, provide, to the application/function 110, information (e.g., a comment ID) for identifying a comment to be displayed which is obtained as a result of filtering, and allow the application/function 110 to directly acquire the body of the comment from the comment providing unit 140 based on the information.

It is to be noted that the series of processes performed on the comment in this embodiment can be also performed on a comment posted for an event occurring in an actual time.

As described above, an information display control device according to an aspect of the present disclosure is the information display control device that regulates the total data amount of comments to be outputted, by outputting, when many comments are present, the comment of the sender that is unchanged since it was sent and the user desires to browse among the comments, as well as by reducing information amounts of comments of senders that are other than the comment and outputting the comments having the reduced information amounts. Thus, the user can easily find the comment of the sender that the user desires to browse among the comments, and simultaneously learn about an overview of the other comments.

Moreover, the information display control device regulates the total data amount of comments to be outputted, by outputting, when the comments are present, the comment of the sender that is unchanged since it was sent and the user desires to browse among the comments, as well as by reducing a character string of each of comments of senders other than the comment without changing a meaning indicated by the comment, and outputting the comments. Thus, the user can easily find the comment of the sender that the user desires to browse among the comments, and simultaneously learn about the overview of the other comments.

Furthermore, the information display control device regulates the total data amount of comments to be outputted, by outputting, when the comments are present, only the comment of the sender that the user desires to browse among the comments. Thus, the user can find the comment of the sender that the user desires to browse among the comments.

Moreover, it is possible to specify a time when many comments are posted, based on a comment amount per unit time that is generated for dynamic content. The above-described comment display control is performed in a period of time including the specified time. Thus, the user can find the comment of the sender that the user desires to browse among the comments, when the comment amount per unit time is large.

Furthermore, it is possible to specify a time when many comments are posted, based on a comment amount per unit time that is generated for an event in an actual time. The above-described comment display control is performed in a specified period of time. Thus, the user can find the comment of the sender that the user desires to browse among the comments, when the comment amount per unit time is large.

Moreover, it is possible to specify a comment of a sender having a close relationship with the user of the information display control device. Thus, the user can find the comment of the sender having the close relationship with the user among the comments.

(Embodiment 2)

Non-limiting Embodiment 2 of the present disclosure is described with reference to the drawings. In Embodiment 1, to determine the importance level of each comment, the sender level of each of the senders of the respective comments is determined using the relationship information between the user and each sender.

In this embodiment, the sender level of each sender is determined using not relationship information between a user and the senders but the objective reliability level of each sender.

A service of determining an objective reliability level of each person on a network (hereafter, referred to as a rating service) has been so far provided as a service on the network. Specifically, the rating service determines that a highly influential person in a society, a person whose posted comments are regularly read by many users, or the like has a high objective reliability level. A value (score) is provided as the determination result. The value (score) is used for determining the sender level of each sender.

FIG. 15 is an exemplary sender level definition table. In this example, a higher score indicates a higher objective reliability level. As shown by FIG. 15, a person having no rating, a person having a rating from 1 point to 9 points, a person having a rating from 10 points to 19 points, a person having a rating from 20 points to 29 points, and a person having a rating greater than or equal to 30 points are defined as Level 0, Level 1, Level 2, Level 3, and Level 4, respectively. However, the definition by using the score is just an example, and changes depending on a rating service specification. The sender level of each sender is defined in the above manner, and content (including data, a comment, and so on) is filtered in the same manner as in Embodiment 1. In this case, the comment of a sender having a high objective reliability level is preferentially displayed, and thus it is possible to produce an effect of preferentially displaying a comment having high quality contents.

As described above, an information display control device according to another aspect of the present disclosure is the information display control device that makes it possible to determine the comment of a trustworthy sender based on the reliability level of each sender indicated by an index independent of a relationship with the user of the information display control device. Thus, the user can find the comment of the trustworthy sender among comments.

(Embodiment 3)

Non-limiting Embodiment 3 of the present disclosure is described with reference to the drawings. In Embodiment 1, to determine the importance level of each comment, the sender level of each of the senders of the respective comments is determined using the relationship information between the user and each sender.

In this embodiment, the importance level of each comment is determined using the comment type of the comment.

Comments are classified into comment types. Examples of the comment types include (1) a comment directly sent by a sender (original comment), (2) a comment in which a comment of a third person is cited, to which a comment on the comment of the third person is added, and which is sent (comment with citation), and (3) a comment of a third person which is forwarded without change (forwarded comment). When the comment types are seen from a point of view of the importance levels of the comments, a comment containing more original information is considered to be more important.

Here, comment importance levels, each of which indicates the importance level of the comment, are defined in association with the comment types of the comments, as shown in a comment importance level definition table of FIG. 16.

FIG. 16 is an exemplary comment importance level definition table. The comment types shown by FIG. 16 can be easily determined by analyzing the formats of the comments. For example, in the case where a comment includes the character string "RT" at its start, the comment is determined as a forwarded comment described in (3). Moreover, in the case where a comment includes the character string "RT" not at its start but at its middle, the comment is determined as a comment with citation described in (2). Furthermore, in the case where a comment includes the character string "RT" neither at its start nor at its middle, the comment is determined as an original comment described in (1).

The comment importance levels are defined as follows: the lowest Level 0, the second lowest Level 1, and the highest Level 2 are assigned to the forwarded comment, the comment with citation, and the original comment, respectively.

Figures 17, 18:
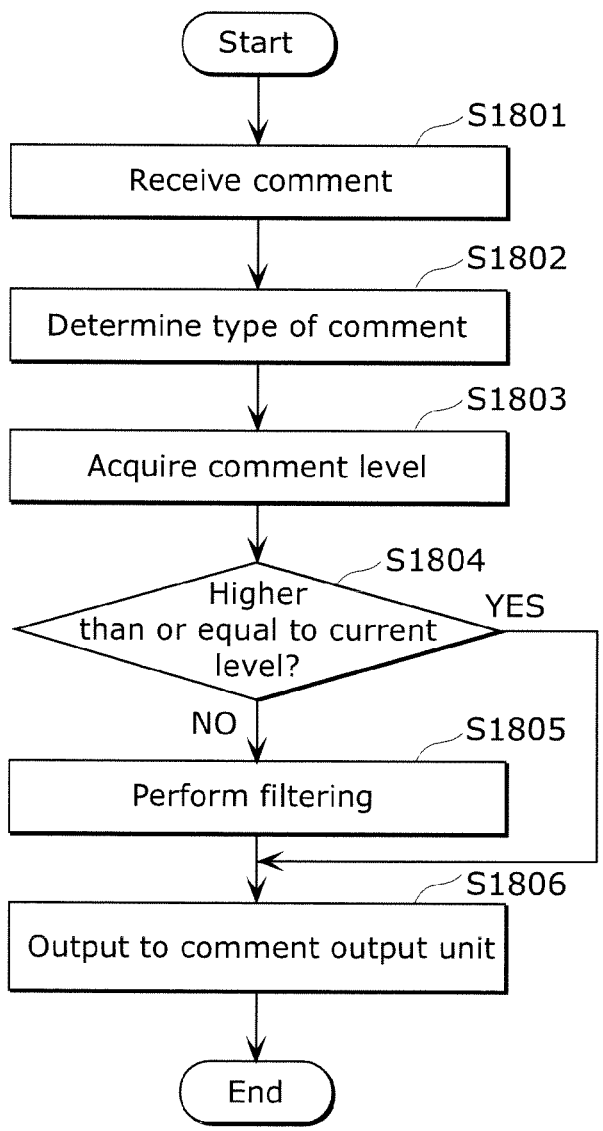
FIG. 17 is an exemplary comment amount level definition table.
FIG. 18 is a flow chart for comment filtering processing.

The following describes filtering processing performed by the comment filtering unit 107 in this embodiment. A basic processing flow is the same as the one described in Embodiment 1, but differs from the one in Embodiment 1 in the number of comment amount levels. Although the number of comment amount levels in the comment amount level definition table (FIG. 10) used in the comment amount level determining process (S901 in FIG. 9) in Embodiment 1 is 5, the number of comment amount levels in this embodiment is 3. FIG. 17 is a comment amount level definition table in this embodiment. Three comment amount levels (Levels 0 to 2) are set for three comment importance levels (0 to 2).

FIG. 18 is a flow chart for comment filtering processing. The processing shown by FIG. 18 shows the details of the comment filtering process (S1202). The comment filtering unit 107 receives a comment from the comment extracting unit 104 (S1801), and analyzes the comment type of the comment (S1802). As stated, the comment type analysis is performed by analyzing the format of the comment.

Next, the analyzed comment type is checked by reference to the comment level definition table (FIG. 16), to determine the comment level of the comment (S1803).

Then, the determined comment level is compared to a comment level corresponding to a comment amount level set by the comment amount determining unit 106 (S1804). When the determined comment level is higher than or equal to the comment level (YES in S1804), the comment is directly outputted (S1806). In contrast, in the case where the determined comment level is less than the comment level (NO in S1804), the comment is filtered (S1805) and then outputted (S1806).

The filtering process (S1805) involves: (1) simply discarding a comment; (2) deleting a cited part from a comment with citation; (3) maintaining a predetermined number of characters from the start of a comment and deleting the remaining characters; (4) deleting part of a comment other than an important key word included in, for instance, a prepared important key word dictionary; and so on.

As sated, it is possible to produce an effect of presenting more meaningful information items to the user, by determining the importance level of the comment using the comment type as a criterion and performing the filtering process.

As described above, an information display control device according to yet another aspect of the present disclosure is an information display control device that reduces, when the comments are present, the information amount of the unimportant comment, and outputs the unimportant comment. Thus, the user can easily find the important comment among the comments, and simultaneously learn about the overview of the other comments.

(Embodiment 4)

Non-limiting Embodiment 4 of the present disclosure is described with reference to the drawings. Although Embodiment 1 describes the example of displaying the inputted comments in chronological order, this embodiment describes an example of writing a comment on a page (one page of a book or a magazine displayed on a liquid crystal display or the like) of an electronic book or the like, and browsing the electronic book together with the comment. It is to be noted that the electronic book is an example of still image content.

The comment amount is determined using the number of comments per unit time in Embodiment 1, whereas the comment amount is determined using the number of comments per unit display area in this embodiment.

Figure 19:
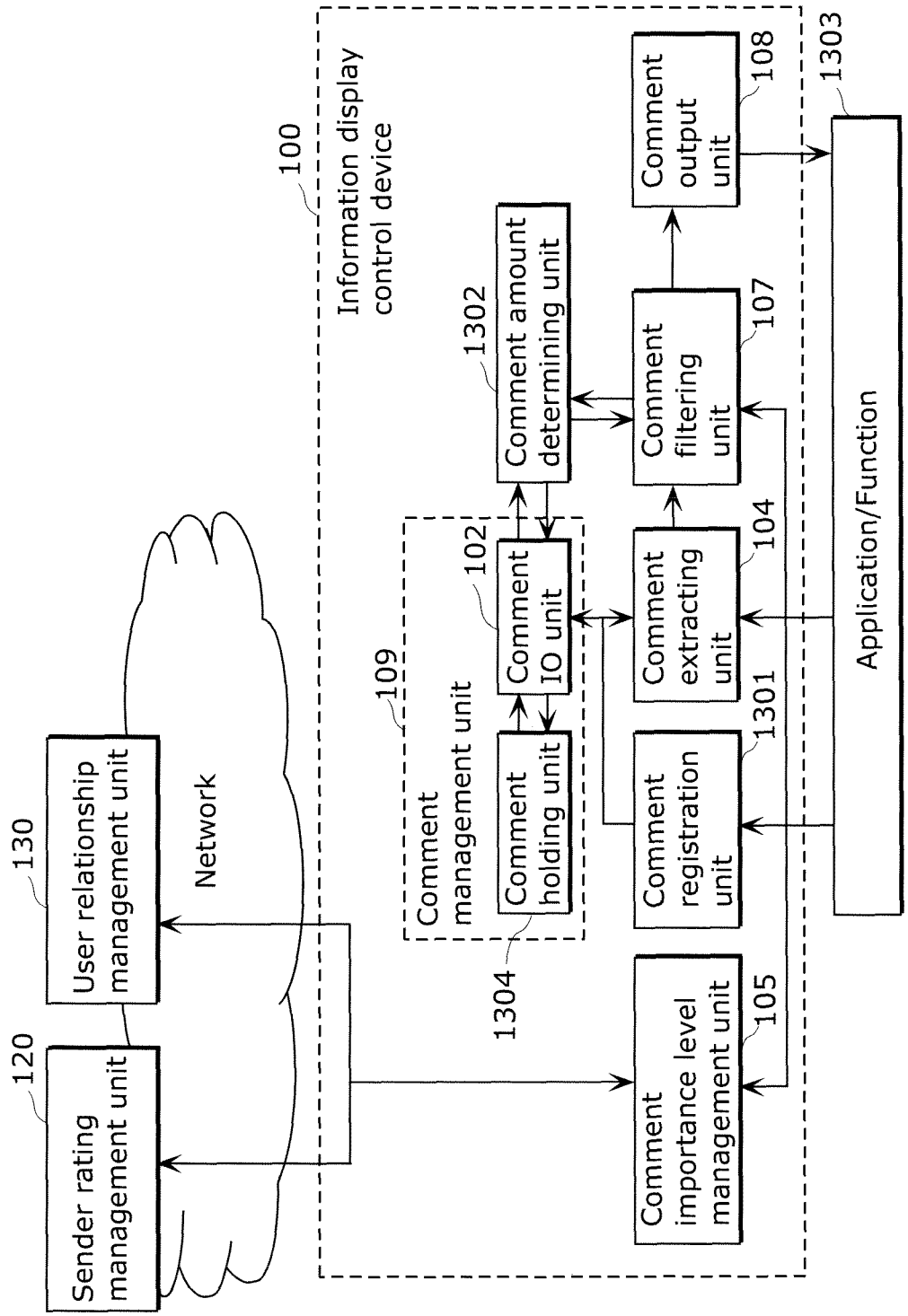
FIG. 19 is an exemplary functional block diagram showing an information display control device according to Embodiment 4 of the present disclosure.

The operation of an information display control device 100 in this embodiment is described with reference to FIG. 19. Constituent elements to which the same reference signs are assigned as in FIG. 1 basically perform the same processes as those in Embodiment 1. An application/function 1303 in this embodiment has both a function to register a comment and a function to extract a comment. In other words, the application/function 1303 registers, in the comment management unit 109, comments received from many terminals, and extracts the comments registered in the comment management unit 109 and transmits the extracted comments to the terminals. For example, a message board system is similar to the application/function 1303.

A user reads the electronic book on an application, designates an article to which the user desires to add a comment, and inputs the comment for the article. The inputted comment is stored in a comment holding unit 1304 via a comment registration unit 1301 and the comment IO unit 102.

Figure 20:
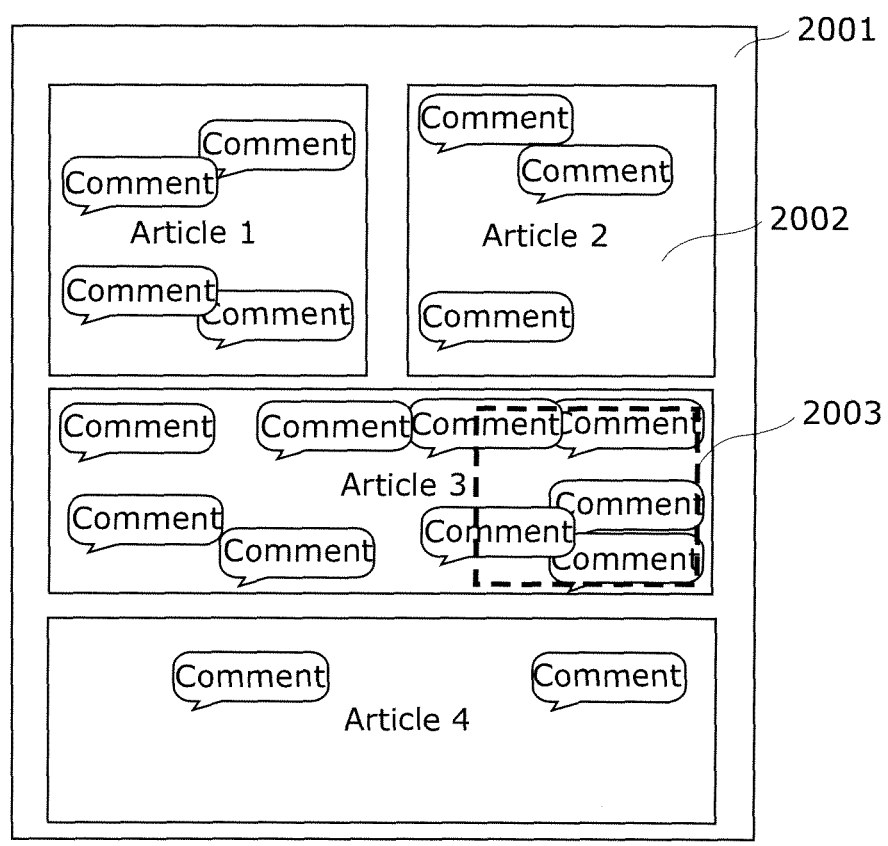
FIG. 20 is a diagram showing an exemplary screen for static content to which comments are posted.

FIG. 20 is an exemplary screen of an electronic book or the like to which comments are added. Each of the comments and information indicating on which page of the electronic book and at which position on the page the comment is posted are stored in the comment holding unit 1304. The application/function 1303 instructs, to the comment extracting unit 104, comments to be displayed on a page of the electronic book. The comment extracting unit 104 acquires, from the comment IO unit 102, comments displayed on the page of the electronic book. Next, the comment extracting unit 104 outputs to the acquired comments to the comment filtering unit 107.

A comment amount determining unit 1302 acquires comments from the comment filtering unit 107, and determines a comment amount. In this embodiment, the comment amount is determined using the number of comments per unit display area. To put it another way, since it is significant that the comment amount is limited to an amount easy for the user to view, when the comments are displayed on the page of the electronic book that is free from time concept, viewability is determined by a density of comments displayed simultaneously (the number of comments per unit display area).

Here, it is possible to set a unit display area as (1) one page 2001, (2) one article 2002, (3) simple area 2003, and so on. A comment amount level is determined by classifying a comment amount based on the number of comments per unit display area. It is to be noted that although the comment amount is determined using the number of comments per unit display area, the comment amount may be determined using a sum of the numbers of characters per unit display area which constitute respective comments or a sum of the numbers of ideographic characters (e.g., Chinese characters) per display unit area which are used for respective comments. This is because more accurate determination is made possible than the determination based simply on the number of comments as there is a case where it is difficult to view a comment when the number of comments is small but the number of characters is large, and a larger number of ideographic characters results in more information amount.

It is desirable to appropriately adjust threshold values (conditions that the comment amount determining unit 1302 sets to the comment filtering unit 107) based on, for instance, the number of comments, the number of characters, or the number of ideographic characters that are used to determine the comment amount. When the comment amount levels are set in this manner, just like Embodiments 1 to 3, it is possible to display only a comment having a high importance level by determining the importance levels of the comments according to the comment amount levels. Thus, it is possible to produce the same effect also in the application that displays the comment on the page of the electronic book that is free from the time concept.

It is to be noted that the comment amount determining unit determines the comment amount and only the comment having the high importance level is displayed according to the comment amount in all the embodiments, the comment amount determining unit is not necessarily indispensable. Only the comment having the high importance level may always be displayed regardless of the comment amount. Here, the user is allowed to set the importance levels of comments to be displayed. Moreover, the user may be allowed to select whether only the comment having the high importance level is always displayed or displayed according to the comment amount.

As described above, an information display control device according to still another aspect of the present disclosure is the information display control device that makes it possible to determine the region in static content on which the lots of comments are posted, based on the comment amount posted unit per area of the static content. The above-described comment display control is performed on the determined region. Thus, the user can find the comment of the sender that the user desires to browse among the comments, when the comment amount per unit area is large.

Industrial Applicability

The present disclosure is applicable to apparatuses and services that allow users to post comments on a broadcast program, a recorded broadcast program, video content on a network, magazine content, and so on, and enjoy the content together with the comments.

The invention claimed is:

1. An information presentation control device comprising:
an acquisition unit configured to acquire a plurality of information items sent by a plurality of senders;
an information total amount calculation unit configured to calculate a total amount of the information items acquired by the acquisition unit;
a sender importance level determining unit configured to determine sender importance levels each of which indicates how important a different one of the senders is and is defined based on a closeness level indicating how socially close the one sender and a user of the information presentation control device are or a reliability level indicating how socially reliable the one sender is;
an information total amount determining unit configured to determine whether or not the total amount of the information items calculated by the information total amount calculation unit is greater than a predetermined value;
a filtering unit configured to perform, when the information total amount determining unit determines that the total amount of the information items is greater than the predetermined value, at least one process on an information item having a lower sender importance level, among the information items, so that an amount of the information item is reduced more, the amount of the information item being the number of characters or symbols constituting the information item; and
an output unit configured to output the information items after the filtering unit performs the process.

2. The information presentation control device according to claim 1,
wherein the filtering unit is configured to perform the process by deleting, for each of the information items, part of the characters or symbols constituting the information item having the lower sender importance level so that the information item is reduced more without changing a meaning represented by the information item.

3. The information presentation control device according to claim 1,
wherein the filtering unit is configured to perform the process by deleting, for each of the information items, an information item having a sender importance level lower than the predetermined value, among the information items.

4. The information presentation control device according to claim 1,
wherein each of the information items is sent for dynamic content by the one sender in association with a reproduction time for the dynamic content, and
the total amount of the information items is a total number of information items per unit time in the dynamic content or a total data amount of information items sent in a unit time.

5. The information presentation control device according to claim 1,
wherein each of the information items is sent for static content by the one sender in association with a position in the static content, and
the total amount of the information items is a total number of information items per unit area of the static content or a total data amount of information items included in a unit area.

6. The information presentation control device according to claim 1,
wherein each of the information items is sent for an event in an actual time by the one sender in association with a time in the actual time, and
the total amount of the information items is a total number of information items per unit time in the actual time or a total data amount of information items sent in a unit time.

7. The information presentation control device according to claim 1, further comprising
a relationship management unit configured to classify, into one of brackets, the closeness level,
wherein each of the sender importance levels is the closeness level between the one sender and the user of the information presentation control device.

8. The information presentation control device according to claim 1, further comprising
a reliability level management unit configured to classify, into one of brackets, the reliability level independently of the user of the information presentation control device,
wherein each of the sender importance levels is the reliability level of the one sender.

9. The information presentation control device according to claim 1, further comprising
a comment importance level determining unit configured to determine comment importance levels each of which indicates how important a different one of the information items is,
wherein the filtering unit is configured to perform, when the information total amount determining unit determines that the total amount of the information items is greater than the predetermined value, at least one process on the information items so that an amount of an information item, among the information items, having a lower comment importance level is reduced more.

10. The information presentation control device according to claim 1,
wherein the acquisition unit is configured to acquire, as one of the information items, a short text information item including a text composed of a character or a symbol and having a length shorter than a predetermined length.

11. An information presentation control method comprising:
acquiring a plurality of information items sent by a plurality of senders;
calculating a total amount of the information items acquired in the acquiring;
determining sender importance levels each of which indicates how important a different one of the senders is;
determining whether or not the total amount of the information items calculated in the calculating is greater than a predetermined value;
performing, when it is determined in the determining of whether or not that the total amount of the information items is greater than the predetermined value, at least one process on an information item having a lower sender importance level, among the information items, so that an amount of the information item is reduced more, the amount of the information item being the number of characters or symbols constituting the information item; and
outputting the information items after the performing.

* * * * *